(No Model.) 3 Sheets—Sheet 1.
L. W. YAGGY.
ASTRONOMICAL CHART.
No. 554,101. Patented Feb. 4, 1896.
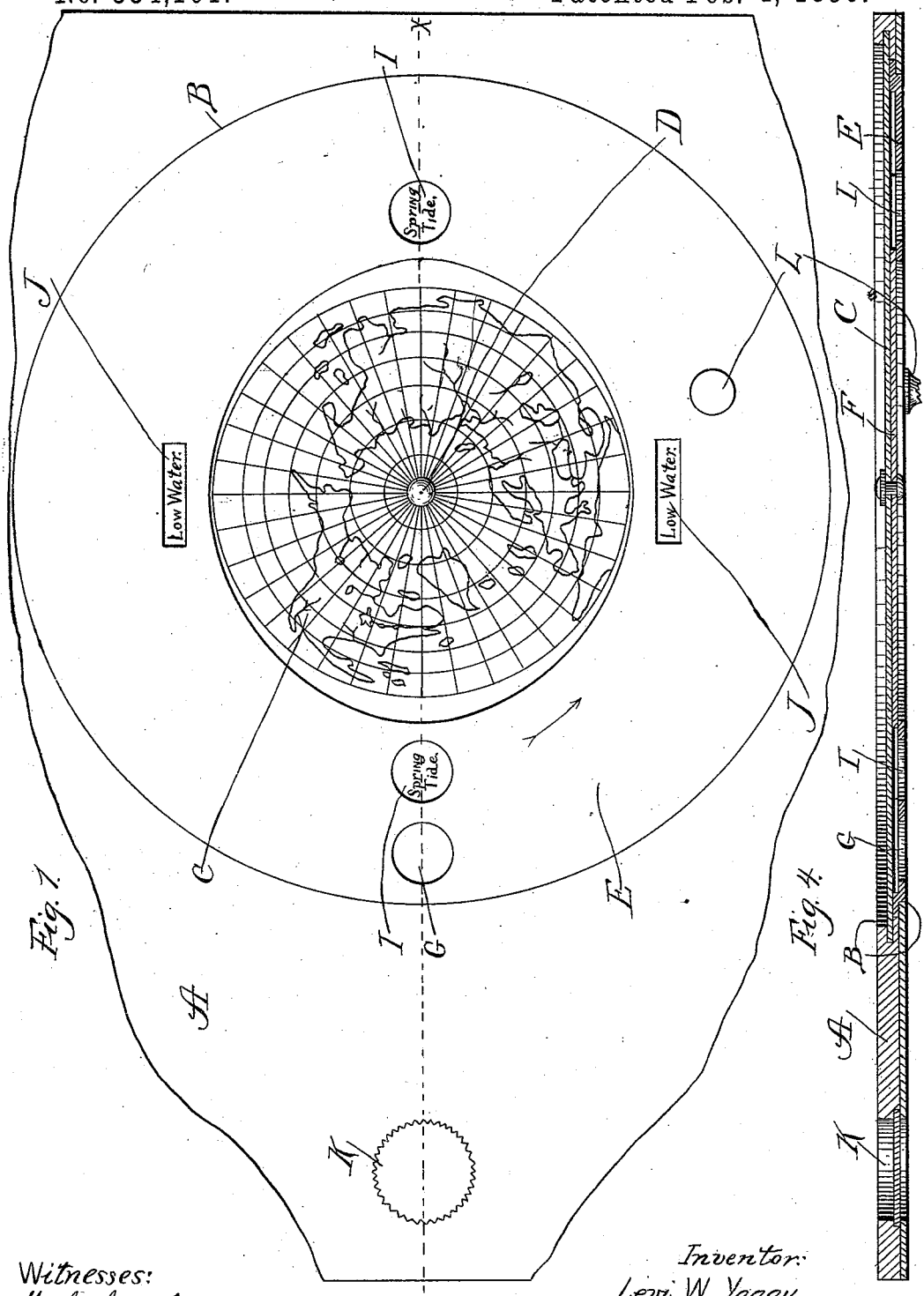
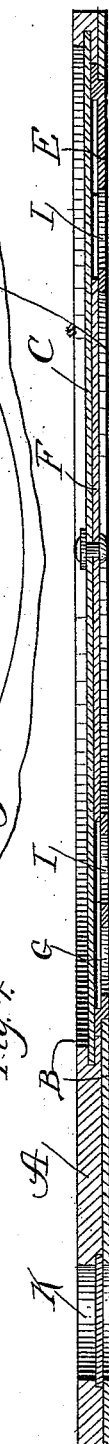
Witnesses:
Inventor:
Levi W. Yaggy.
By Coburn & Thacher
Attorneys.

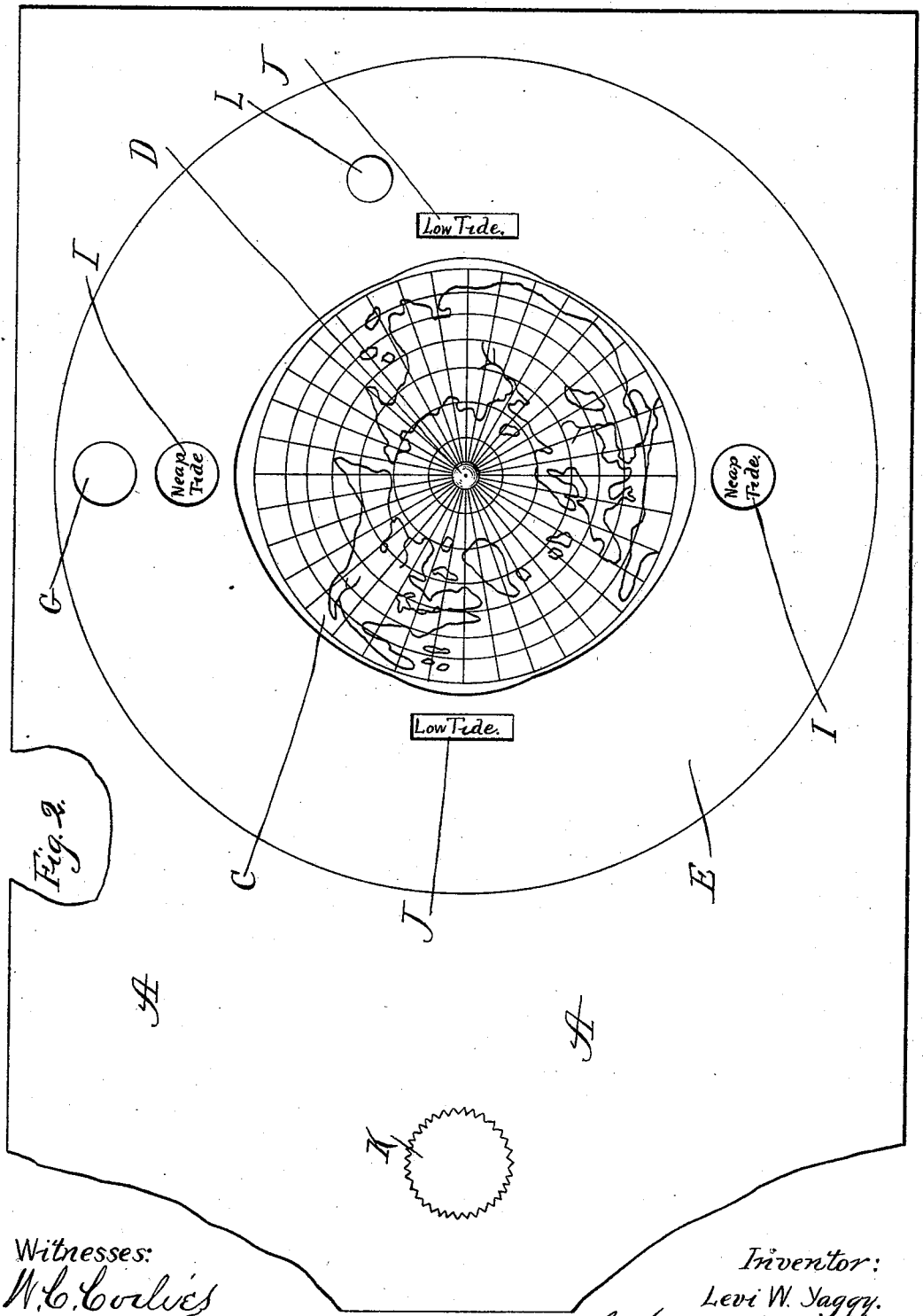

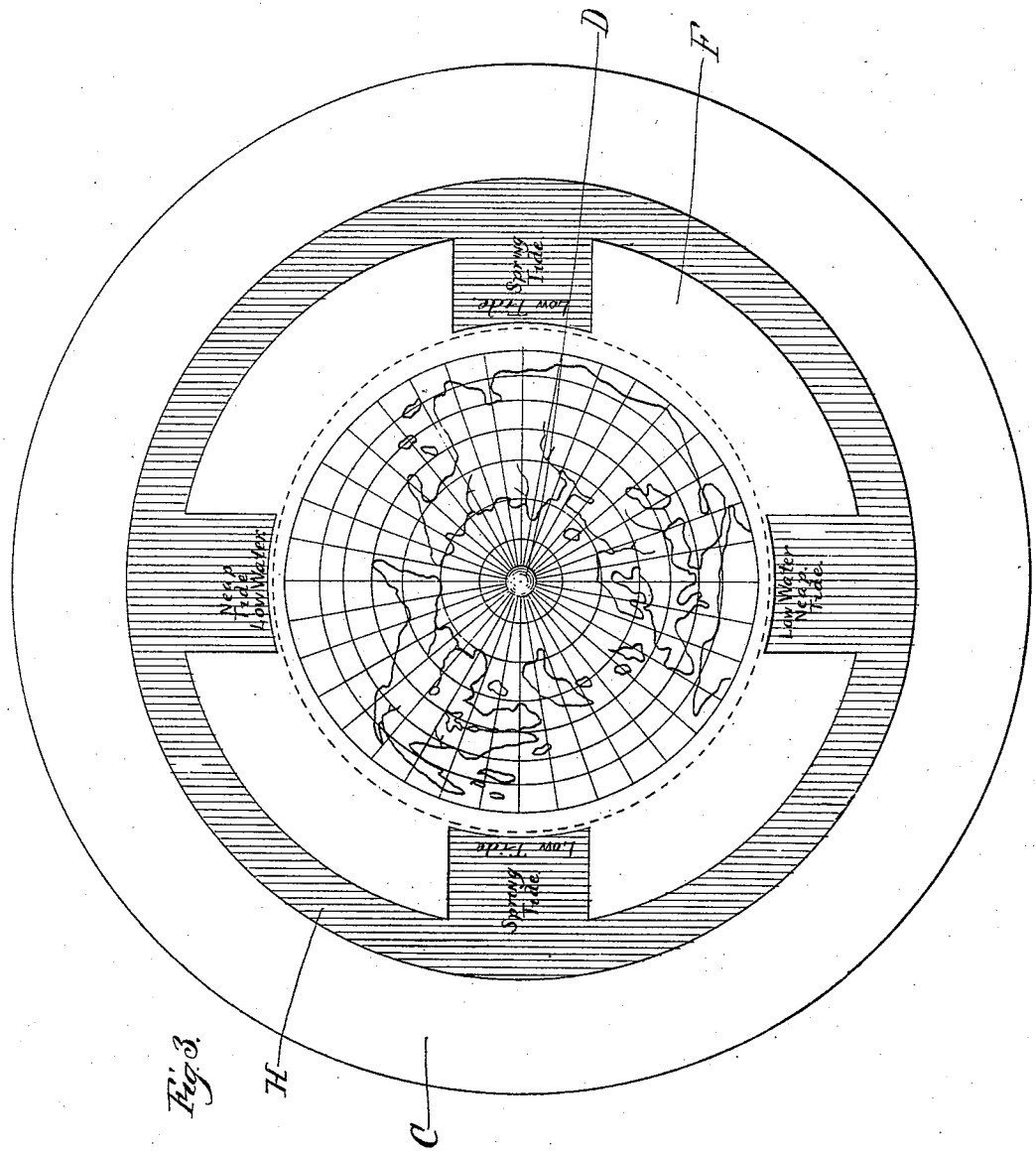

UNITED STATES PATENT OFFICE.

LEVI W. YAGGY, OF LAKE FOREST, ILLINOIS.

ASTRONOMICAL CHART.

SPECIFICATION forming part of Letters Patent No. 554,101, dated February 4, 1896.

Application filed May 1, 1893. Serial No. 472,599. (No model.)

*To all whom it may concern:*

Be it known that I, LEVI W. YAGGY, a citizen of the United States, residing at Lake Forest, in the county of Lake and State of Illinois, have invented a certain new and useful Improvement in Astronomical Charts Illustrating Tides, which is fully set forth in the following specification, reference being had to the accompanying drawings, in which—

Figure 1 shows a front view of the chart with the sun and moon in conjunction relative to the earth. Fig. 2 shows the moon in a position just entering the fourth quarter of its orbit around the earth. Fig. 3 shows a front view of the celluloid disks in position relative to each other detached from the rest of the chart. Fig. 4 shows a section taken through the line X X, Fig. 1, looking downward.

The object of my invention is to illustrate by a simple chart the changes of the tide which can be exhibited to scholars. By moving parts of the chart the moon is carried in its orbit around the earth, and the changes of the tide illustrated by means of transparent celluloid plates, all as hereinafter described.

In the accompanying drawings, the same letters represent the corresponding parts of my chart in the different figures.

A is a stiff cardboard which constitutes the frame or supporting part of the chart. It can be made of any suitable size and of any stiff material. In this cardboard there is a large opening B to which there is attached on the back side of the cardboard a celluloid plate C that entirely fills the opening B in the cardboard. On the center of this celluloid plate, which is rigidly attached to the cardboard A and fills the entire opening B, is printed a representation of the earth, showing the north pole D at its center. In front of this celluloid disk C is an opaque circular ring E that fits into the opening B in the cardboard A, so as to be readily revolved in it. There is attached to this ring E a transparent celluloid disk F that has no coloring upon it. The interior of the ring E is cut so as to show the earth, and on opposite sides of it the tide. There is also a round opening G cut in the ring E to represent the moon. The representations of the tide are in line in cross-section with the moon. The stationary celluloid disk on which the representation of the earth is painted has a black ring H painted on it, in which the words "Spring tide" and "Neap tide" and "Low water" are left unpainted, so as to be illuminated by the transmitted light with which the chart is exhibited. There are two openings I I cut in the ring E to exhibit the words "Spring tide" and "Neap tide" as the ring is turned in the frame A, and there are also openings J J cut in the ring to exhibit the words "Low water" and "Low tide" as the ring is turned.

K is an opening in the frame A, in which there is a celluloid disk to represent the sun.

L is a little thumb-piece attached to the ring E, by which it is turned in the frame A.

Fig. 1 represents the sun and moon in conjunction with the earth, and the openings I I exhibit the words "Spring tide." The operator then takes hold of the thumb-piece L and by turning the ring E in the frame A the moon is carried around in its orbit, and the high tide follows the moon as it passes in its orbit around the earth, the moon always showing through the clear transparent portion of the celluloid plate C outside of the dark painted circle on that plate. When the moon is carried around one-fourth in its orbit the openings I I exhibit the words "Neap tide" and the openings J J exhibit the words "Low tide" in horizontal line with the earth and sun. The same tide is shown when the ring is revolved so as to carry the moon one-half around its orbit or directly opposite the sun, bringing the earth between the sun and moon, as when the moon and sun are in conjunction, and the words "Spring tide" are again exhibited. As the ring is still further revolved, carrying the moon to the position three-fourths around its orbit, the words "Neap tide" are again exhibited above and below the earth and "Low tide" in horizontal line with the sun and earth, and as the ring is revolved around directly between the sun and earth the spring tide is shown in horizontal line with the sun and earth and low water above and below the earth.

I show the earth of a little greater diameter from top to bottom of the chart than I do in a plain taken through the sun and earth in order to show that there is a little tide always caused by the sun, and that when the moon is not in conjunction with the sun there is a little larger white margin in horizontal line through the sun and earth than there is at right angles to that line when the moon is in conjunction with the sun.

It will be observed that one can readily understand from this chart the causes of the tide and how it follows the moon in its orbit around the earth, and also what effect the sun has upon the tide.

The operation and construction of the chart are very simple and can be readily understood, the representation of the moon being carried around the earth by simply turning the ring E in the frame of the chart, the earth being always exhibited through the ring, and the opening in the ring being cut of such shape as to show the tide in the transparent part of the celluloid disk on the circumference of the earth.

The chart is exhibited so that the light is transmitted through the celluloid in the openings of the frame of the chart and through the openings in the opaque ring which revolves in the frame, exhibiting the position of the sun, the earth, and the moon as it passes in its orbit around the earth, and the condition of the tides.

The celluloid disk which is attached to the opaque ring E has recesses cut in its circumference so as not to cover the words "Spring tide" and "Neap tide" when the ring is revolved into position to exhibit those words through it. This is for the purpose of preventing any obscurity of those words which might be otherwise occasioned.

Having thus fully described the construction and operation of my invention, what I claim, and desire to secure by Letters Patent, is—

1. In an astronomical chart, a framework containing an opening; a representation of the earth upon a plate behind said opening; an annular ring provided with an elliptical opening revoluble in said opening and containing further openings to exhibit words descriptive of the tides printed upon the aforesaid plate at appropriate intervals; a representation of the moon in said ring, the whole so constructed that as the ring rotates the revolution of the moon about the earth, the consequent tides and the words descriptive of those tides are disclosed in appropriate conjunction, substantially as specified.

2. In an astronomical chart, a framework containing an opening; a transparent plate behind said opening provided with a representation of the earth and with the words descriptive of the state of tide; an annular opaque ring revoluble in said opening and so shaped as to expose a representation of the tides about the figure of the earth, the said ring containing openings to expose the appropriate words upon the transparent plate and the appropriate position of the moon as the ring is revolved, substantially as specified.

3. In an astronomical chart, a framework; a representation of the sun upon said framework; a transparent plate behind an opening in said framework, provided with a slightly oblong printed representation of the earth, and with words descriptive of the states of tide; an opaque annular ring revolving in said opening about the representation of the earth so shaped as to expose, as it is revolved in connection with the earth, both solar and lunar tides; a representation of the moon through an opening in said ring; and printed words descriptive of the tide exposed through further openings in the ring at appropriate points in the revolution of the said ring, substantially as described.

LEVI W. YAGGY.

Witnesses:
ALOYSIA HELMICH,
ROBERT C. PAGE.